Oct. 27, 1931.                R. J. POMEROY                 1,828,942
                    PRODUCTION OF CORRECTED SOUND RECORDS
                  Original Filed May 22, 1928    6 Sheets-Sheet 1
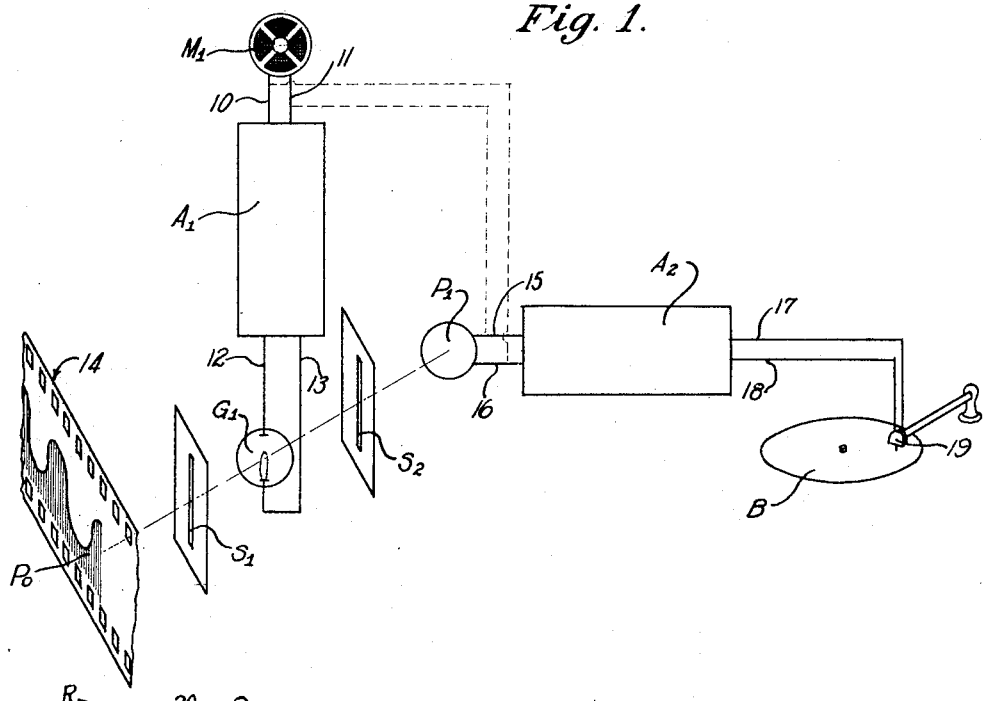
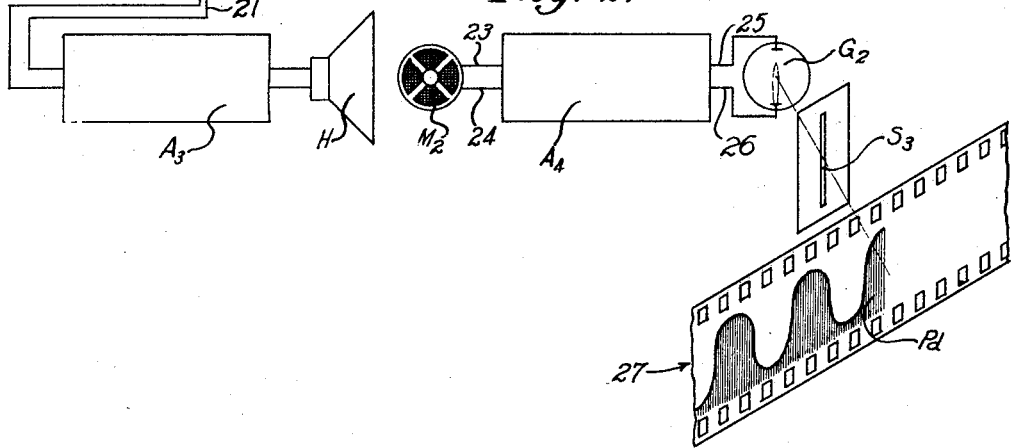
Inventor
Roy J. Pomeroy
Attorney.

Oct. 27, 1931.    R. J. POMEROY    1,828,942
PRODUCTION OF CORRECTED SOUND RECORDS
Original Filed May 22, 1928    6 Sheets-Sheet 2
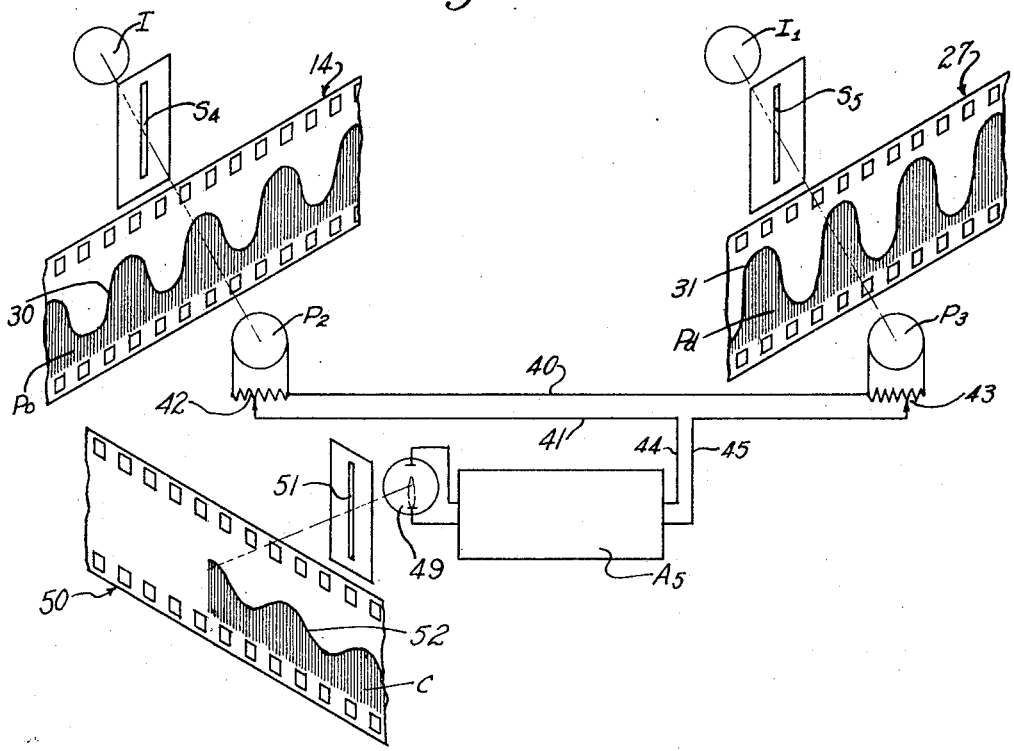
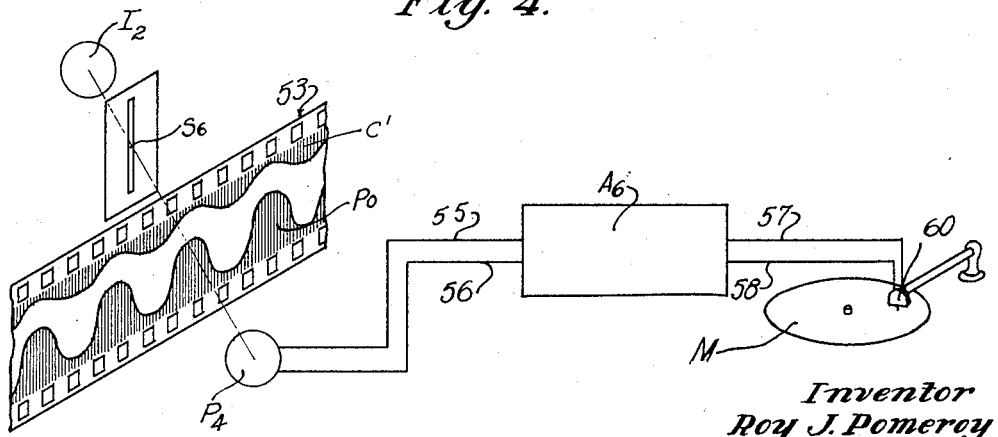
Inventor
Roy J. Pomeroy
Attorney.

Oct. 27, 1931.  R. J. POMEROY  1,828,942
PRODUCTION OF CORRECTED SOUND RECORDS
Original Filed May 22, 1928   6 Sheets-Sheet 5
Fig. 10.
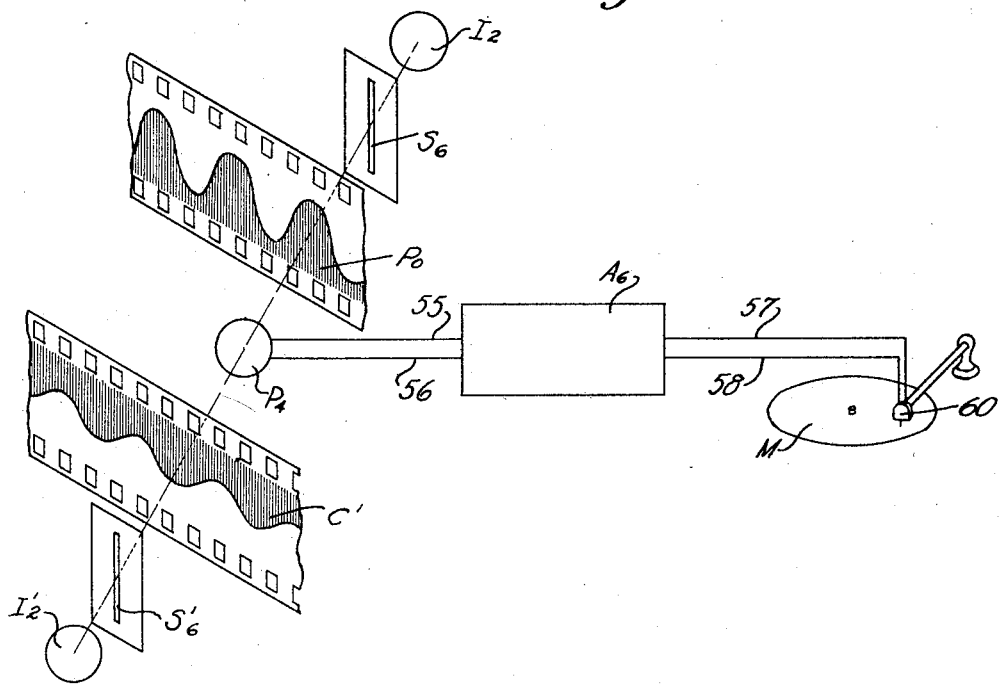
Fig. 11.
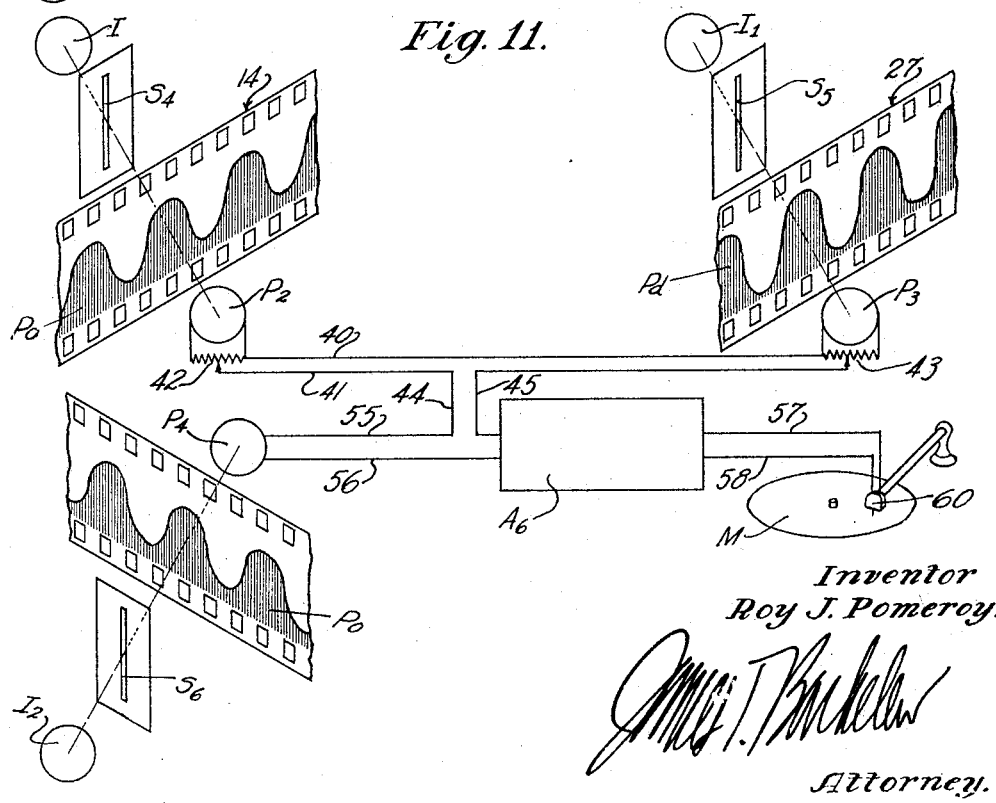
Inventor
Roy J. Pomeroy.
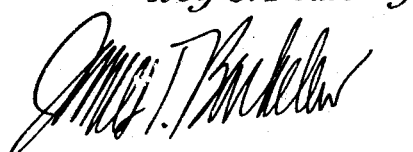
Attorney.

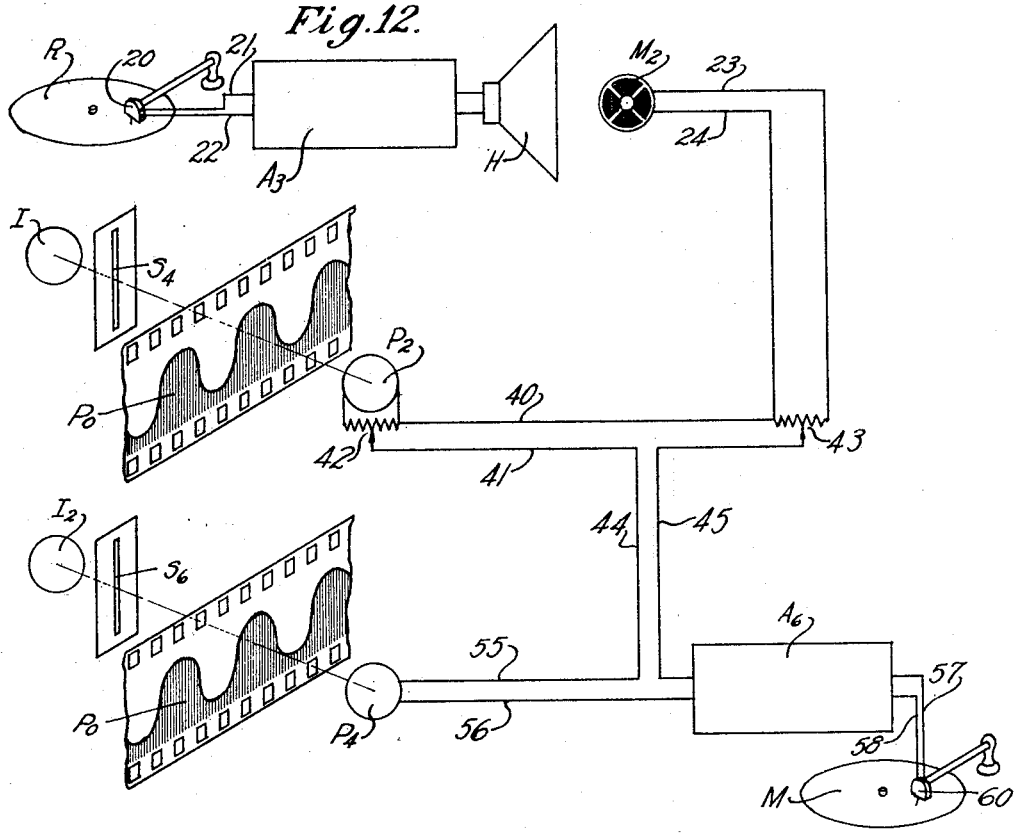
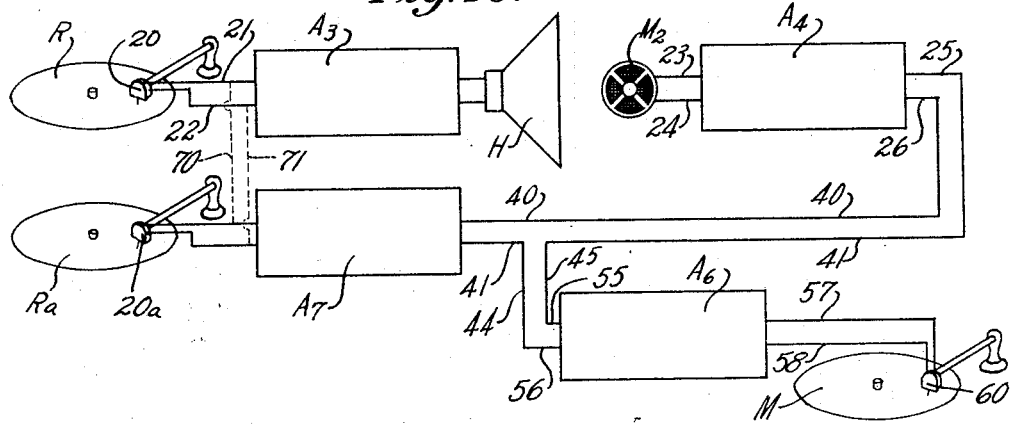

Patented Oct. 27, 1931

1,828,942

UNITED STATES PATENT OFFICE

ROY J. POMEROY, OF LOS ANGELES, CALIFORNIA

PRODUCTION OF CORRECTED SOUND RECORDS

Application filed May 22, 1928, Serial No. 279,791. Renewed September 5, 1931.

This invention relates generally to sound records, and is particularly concerned with methods of perfecting the reproduction of sound from mechanical records. This application is a companion to my application entitled "System for correcting sound records", Serial No. 279,789, filed on even date herewith. Generally, the present application may be considered as disclosing means whereby the invention broadly claimed in said companion application may be applied to the correction of mechanical records. Attention is also called to my copending application entitled "System for correcting sound records", Serial No. 279,790, filed on even date herewith, in which appear particular variations of the general system set out in the first-mentioned companion application, certain of these variations being shown in the present application in connection with the correction of mechanical records.

In recording sound upon a mechanical record, and in subsequently reproducing sound therefrom, certain distortions are introduced within the various units involved, and these distortions vary with the frequency of sound vibration. Thus, while it may be possible to assemble a system which will perfectly or nearly perfectly, reproduce sounds of a given pitch, it has been found quite impossible to accommodate the system equally well to sound vibrations throughout the entire range of audible frequencies. Considering the making of an ordinary phonograph record, for instance, it is found that although the mechanism actuating the cutting needle may respond quite perfectly to sounds of some given pitch, it will not respond accurately to sounds of other pitches. And in reproduction, the usual electro-magnetic pick-up device and speaker unit have similar disabilities and accordingly introduce further distortions.

It may therefore be stated as an object of this invention to provide a means for compensating these distortions so that more perfect reproduction of sound will be obtainable.

The general method provides a method and system for making a distortion-corrected record, and this is done by introducing to the record correction distortions that are compensatory of, or have a neutralizing effect on, the distortions which are introduced in recording and reproduction. This is accomplished in the present instance by making a photographic distortion-corrected sound record, or photographic sound record compensated for distortions, and from this making a distortion-corrected mechanical record from which distortionless reproduction is obtainable.

How this is done will be best understood from the following detailed description of a method and system for carrying out the invention, reference for the purpose being had to the accompanying drawings, in which:

Figure 1 shows a system for making an original sound record and a distorted mechanical record;

Fig. 2 shows a system for audibly reproducing and photographically recording sound from the distorted mechanical record;

Fig. 3 shows a system for making a photographic correction record;

Fig. 4 shows a system for making a photographically distortion corrected mechanical record;

Fig. 10 shows a variation of the corrected mechanical record making system of Fig. 4;

Fig. 11 shows a variational corrected mechanical record making system, being a combination of parts of the systems of Figs. 4 and 3;

Fig. 12 shows a system similar to Fig. 11, but being combined with parts of the system of Fig. 2; and Fig. 13 shows a system of making a corrected mechanical record without the use of photographic records, being a modification of the system of Fig. 12.

Figure 5:
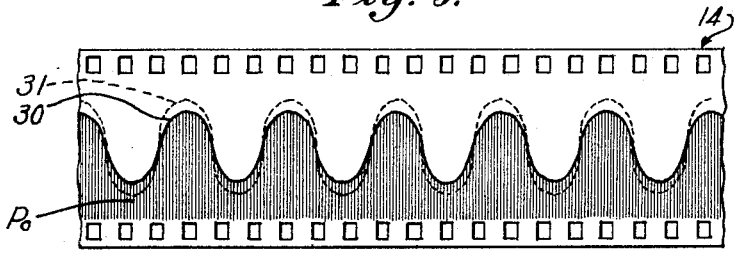
Fig. 5 shows an original photographic sound record.

With reference to Figure 1 the microphone M1 is connected through leads 10 and 11 to the amplifier A1. Amplifier A1, and other amplifiers to be mentioned later, may be any suitable electrical or vacuum tube amplifiers adapted to amplify an audio-frequency electrical current. The output leads 12, 13 of amplifier A1 are connected to a glow tube G1, or other light varying device, before which travels a film 14. A plate having a slit S1 is interposed between the glow tube and the film. A second plate having a slit S2 is positioned opposite the glow tube, and beyond it is a photo-electric cell P1. Leads 15, 16 from the photo-electric cell P1 connect to the amplifier A2, the output leads 17, 18 of which connect to a recording needle actuating device 19 preferably of the electro-magnetic type.

Microphone M1 picks up the original sound, a sound current being conducted therefrom by the leads 10, 11 to the amplifier A1, and thence, in amplified state, passing through leads 12, 13 to the glow tube G1, the traveling film 14 taking an original photographic positive sound record Po of the original and substantially undistorted sound though its record Po actually contains distortions introduced within the electrical and photographic recording system M1, A1, G1 and S1. However, these units are capable of being designed so that their disabilities are reduced to negligible proportions and hence may be disregarded for the purpose of the present discussion. It will be later pointed out, however, that any distortions actually introduced within this part of the system will also be compensated by the method.

A positive photographic sound record, as referred to above and throughout the specification, is the original photographic record obtained in recording the sound. A negative is the reverse of this record; or is the record obtained by ordinary light printing from a positive record.

Light rays from the glow tube G2 are also transmitted through the slit S2 and affect the photo-electric cell P1. Modulated sound current from the photo-electric cell is conducted by the leads 15, 16 to the amplifier A2, where it is amplified, and is thence conducted by leads 17, 18 to the recording needle actuating device 19 which impresses a record of sound upon a mechanical blank B, this record representing the original sound distorted by the units of the system so far involved. A mechanical blank, in the terminology herein employed, refers to a blank sound record carrier upon which a record of sound vibrations is to be mechanically produced. The term mechanical record carrier refers to the carrier after the sound record has been mechanically impressed, while the term mechanical sound record refers to the actual record of sound vibrations contained upon a mechanical record carrier.

From this point, the description of the various units may be conveniently accompanied by a brief explanation of their operation within the system, and this plan of exposition will hereafter be followed.

Referring now to Fig. 2, the revolving mechanical sound record carrier R is the blank B of Fig. 1 having now a complete record of the distorted sound. The electro-magnetic pick-up device 20 generates a sound current corresponding to the record upon the carrier R, and conducts it through leads 21, 22 to the amplifier A3, the output of which is conducted to speaker H, where it is audibly reproduced. This reproducing system R, 20, A3, H, must be the one, or have identical characteristics with the one to be used in final reproduction. The sound thus reproduced is the original sound altered by the resultant distortions of all of the units of the system thus far passed through, including the distortions of M1, A1, G1, of P1, A2, 19, B, and of R, 20, A3, H. The sound, thus distorted, is picked up by microphone M2 and conducted therefrom as a sound current by leads 23, 24 to amplifier A4. The output leads 25, 26 of amplifier A4 conduct the amplified sound current to a light valve such as a glow tube G2. Sound modulated light from glow tube G2 passes through a slit S3 and makes a photographic sound record, indicated in the figure as a positive Pd, upon a traveling film 27. In order that the record Pd may be of an order exactly like that of the original record Po, the ratio of speed of travel of film 27 to mechanical record carrier R must be equal to the ratio of travel of film 14 to mechanical blank B. This relationship is equivalent to synchronous travel of the films 14 and 27, of mechanical blank B and record carrier R. While the system is illustrated as producing a positive record Pd, it will be understood that whether a positive or a negative is actually obtained depends upon various factors of the system, such as the polarity of the photo-electric cell and microphone with respect to their amplifiers, etc. To avoid confusion it will hereinafter be assumed in all cases throughout the specification, unless otherwise stated, that the sound wave representation is subjected to no reversals from a positive record representing current to a negative record representing current. It will be understood, however, that certain variations as hereinafter described and indicated may be carried out by utilizing such reversals and by correspondingly varying the printing operations. Such variations, of course, lie within the scope of my invention.

Photographic record P*d* may be termed the distortion record P*d* as distinguished from the original photographic record P*o*. Distortion record P*d* then has all of the distortions of the sound reproduced by H plus those introduced by the photographic recording system M2, A4, G2, S3. This last mentioned system must have identical characteristics with the original photographic recording system M1, A1, G1, S1, or both must be so designed as to introduce little or no distortion.

Figure 6:
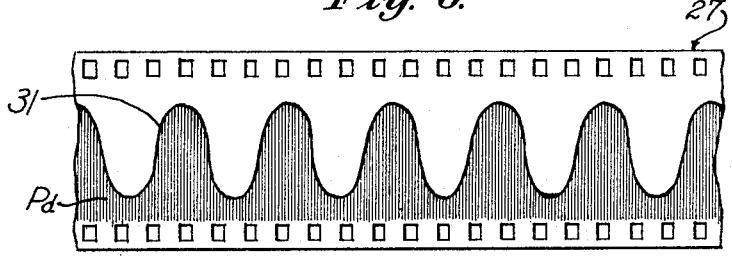
Fig. 6 shows a distortion photographic sound record.

In Fig. 5 is shown the film 14 with the original photographic sound record P*o* having a wavy outline 30. The sound record shown in the drawings and particularly referred to in the specification is of the varying outline, constant density type; it being understood, however, that the specific method may be practiced with any type of photographic record of varying opacity. And for the sake of simplicity, the sound record shown and illustrated is that of a constant uniform sound, and is greatly enlarged in the drawings; a complex sound wave record being understood to function in the same manner. In Fig. 6 is shown the film 27 with the record P*d*. This record is similar to P*o*, but in addition has imposed upon it all of the distortions of the units so far passed through. The record P*d* is therefore referred to as the distortion record and its outline 31 is the distorted curve. The distorted curve 31 is shown superposed in dotted lines upon the positive record P*o* in Fig. 5, and it will be seen that the distortion is represented by the difference in ordinates of the curves 30 and 31.

Whether the amplitude of the distorted curve 31 is greater or less than that of the original curve 30 depends upon the characteristics of the recording and reproducing units, and in any specific case may depend upon the varying factors of sound character. For instance, at one frequency, the distorted curve 31 may be of a greater amplitude than the original curve 30, at another frequency it may be less, while at some intermediate frequency the curves may coincide, indicating that at this frequency no distortional effect is obtained. For the sake of simplicity, only the case in which the distortion effect causes an increase in the sound wave amplitude is illustrated in the drawings. It will later be apparent that although the distortion might equally as well cause a decrease in amplitude, the operation of the system is similar in either case, and therefore, for the sake of simplicity of explanation, the operation will be explained with reference to the aforementioned arbitrarily chosen case; it being understood that the total resultant distortion introduced in reproduction may cause either an increase or a decrease in amplitude of the sound wave, and that the system corrects the record in either case. In other words, the distortion may be either minus or plus with respect to the original record.

A distortion-compensated photographic record is now to be made by the relative addition of opacity to the original record P*o* at those points at which the distortion is relatively minus, or at which the distorted curve 31 falls below the original curve 30, and by the relative subtraction of opacity at those points at which the distortion is relatively plus, or at which the distorted curve 31 rises above the original curve 30, the amount of this relative addition and subtraction being always equal to the distortion at that point. A simple manner of viewing these relations is that the modified record is to be made relatively as much more opaque than the original record as the distortion record is less opaque than the original record, and vice versa, as the case may be. A mechanical record is then made from this distortion compensated photographic record, and it will be seen that this mechanical record has its distortions of reproduction compensated. When this distortion compensated mechanical record is finally reproduced, the distortions introduced by the reproducing system are again added and subtracted in the same sense or directions as before; but now the reproducing system causes the oppositely distorted sound wave of the modified record to be altered within the system to the shape and proportions of the original wave, and distortionless audible reproduction of the original sound is obtained.

Figure 7:
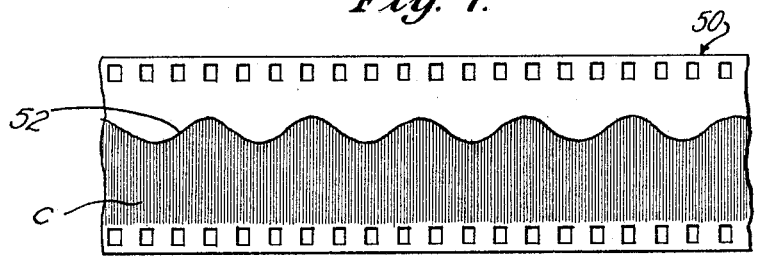
Fig. 7 shows a photographic correction record.

A method of producing these compensated records will now be described, reference for this purpose being had to Fig. 3. Film 14 with the original sound record P*o* is run before a slit S4 behind which is an illuminant I. A photo-electric cell P2 is positioned on the other side of the film opposite the slit S4. Film 27 with the distortion sound record P*d* is run before an exactly similar system consisting of slit S5 and illuminant I1, a photo-electric cell P3 being positioned on the other side of the film opposite slit S5. These two systems must be matched to have substantially identical characteristics, and the films 14 and 27 must be driven in exact synchronism. The photo-electric cells P2 and P3 are then differentially connected together by the leads 40 and 41, so that the current flowing in circuit 40, 41 is the difference of that generated by the photo-electric cells P2 and P3, and therefore represents the difference in the records P*o* and P*d*, or in other words the distortion. For the purpose of relatively balancing the potentials, as will later be more fully explained, potentiometers 42 and 43 are provided across the photo-electric cells P2 and P3 respectively. In series in circuit 40, 41 are leads 44, 45 leading to the amplifier A5, the output current of which is conducted to a glow tube 49 and photographically recorded through slit 51 upon the film 50. A distortion correction record C, shown in Fig. 7, is thus obtained, the outline 52 of which represents the distortion.

Figure 8:
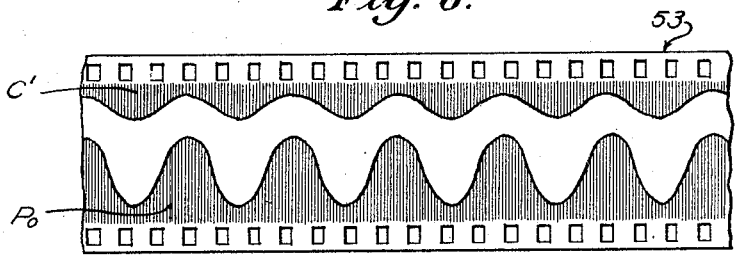
Fig. 8 shows a photographic corrected record for making a corrected mechanical record.
Figure 9:
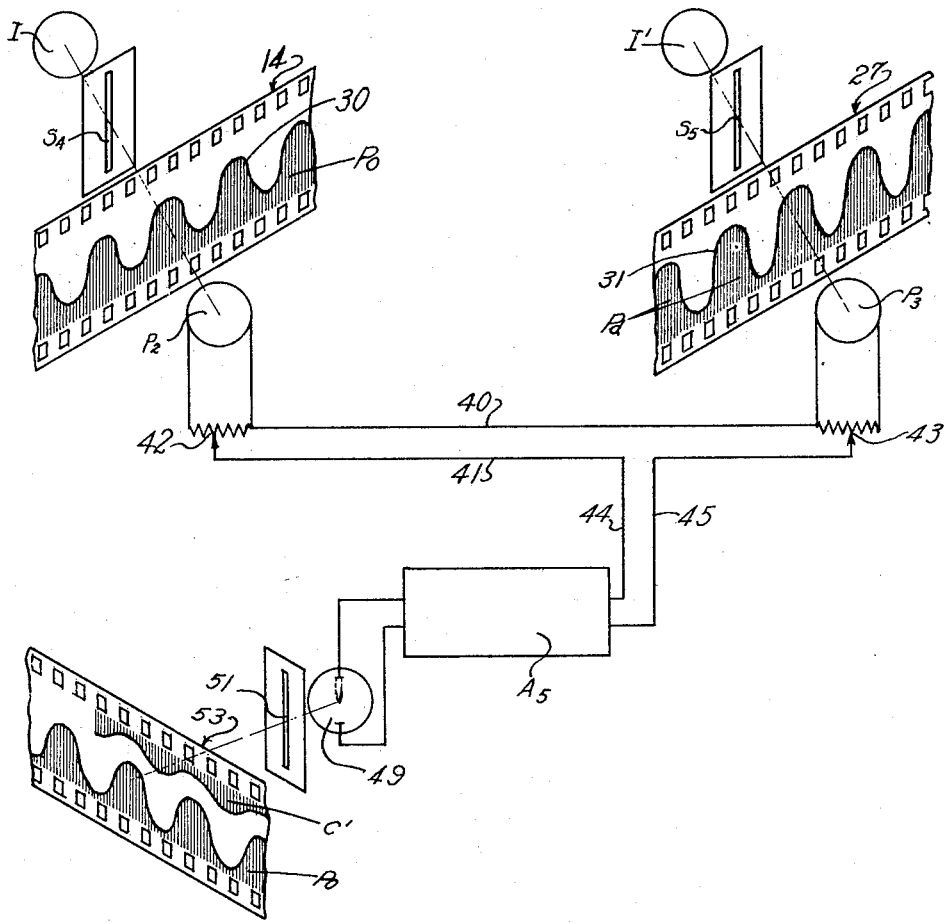
Fig. 9 shows a system for making a distortion-correction record directly upon a film having an original record.

With the system in balance, the differential distortion-current flowing in the circuit 40, 41 to amplifier A5 is a wavy outlined alternating current. The output of the amplifier A5 then consists of a direct current with an amplification of the wavy outline of the distortion current impressed upon it. It will thus be apparent that whether a peak or a depression in the final output current wave, and correspondingly in the correction record C, results from any particular half-cycle of the amplifier input distortion-current depends upon how the leads 40 and 41 are connected into the amplifier A5. Arbitrarily choosing for illustration the case in which a peak in the correction record C corresponds to peaks in the original and distortion positives Po and Pd, as clearly shown in Figs. 3, 4 and 5, a film 53 is then printed along one edge with a negative correction record C' of the record C just obtained, and with the original positive Po along the other, as shown in Fig. 8, care being taken that the two prints, the original record and the correction record, are accurately registered with each other. In case the amplifier input leads are reversed from this arrangement, the negative correction record C' is obtained directly, and may be printed directly with an original record Po, as in Fig. 9. The system there shown is similar to that of Fig. 3, but may be considered as having its amplifier input leads reversed from that arrangement, this reversal resulting in a negative C' being obtained instead of the positive C, as will be understood from a consideration of the characteristics of the ordinary vacuum tube amplifier. In the case illustrated, the correction record C is made directly upon film 53, this film having a previously printed original record Po. Or, if desired, record C' may be made upon a blank film and by subsequent printing operations, combined with an original record Po. As the sound character is determined solely by the outlines of the records, the two records may be laterally positioned upon the single film in any convenient manner which insures an absence of overlapping.

We have now added to the original photographic record Po a correction band of opacity which varies in width by the amount of the distortions, and in a sense negative to that of the distortions. Stated with reference to Fig. 5, we have relatively added opacity by the amount of the distortions when the distorted curve 31 falls below the original curve 30, and relatively subtracted opacity by the amount of the distortions when the distorted curve 31 rises above the original curve 30. Another manner of expressing this is that we have relatively added opacity to the original photographic record by the amount of and negatively to the sense of the distortions.

The last step of the method is carried out by means of the system illustrated in Fig. 4. With reference to that figure, the film 53 with its distortion-compensated sound record is run before a slit S6 behind which is an illuminant I2, and positioned on the opposite side of the film directly opposite slit S6 is a photo-electric cell P4. The distortion-compensated sound record upon film 53 modulates the light rays affecting photo-electric cell P4, and a sound current is accordingly generated thereby. This sound current is conducted by leads 55 and 56 into an amplifier A6, the output sound current of which is conducted by leads 57 and 58 to a recording needle actuating device 60 which impresses a distortion compensated record of sound upon a mechanical record M driven in synchronous relation to traveling film 53. This last recording system I2, S6, P4, A6, 60 must have identical characteristics with the first mentioned mechanical record making system P1, A2, 19, B.

Neglecting the minor disabilities of the photographic recording system M1, A1, G1, S1 and M2, A4, G2, S3, it will now be pointed out how the distortions have been entirely compensated, and distortionless audible reproduction is obtainable from the mechanical record M. Referring to the system illustrated in Fig. 3, and to Fig. 7, film 50 has a record of the difference between the sound records Po and Pd, or in other words of the distortion; and this distortion is made up of that due to the mechanical record making system P1, A2, 19, B, and that of the audible sound reproducing system R, A3, 20, H. The film 53 is then printed with the original record Po and with the record of the distortions, in the manner hereinbefore indicated; and the mechanical record M is then made from the oppositely distorted photographic sound record thus obtained on the film 53, utilizing for this purpose a system P4, A6, 60, M which is exactly similar in characteristics to the original record making system P1, A2, 19, B. The artificially oppositely distorted sound wave representation is then altered by the system P4, A6, 60, M in the same sense or directions as before imposed by the original mechanical record making system P1, A2, 19, B, the distortions this time cancelling or neutralizing the opposite distortions due to the said original mechanical record making system.

The only distortions contained upon the distortion corrected mechanical record M are the opposite distortions due to the reproducing system R, A3, 20, H, and when the record M is finally reproduced by a system having identical distortional characteristics with the original reproducing system, these distortions are also canceled or neutralized and the original sound is audibly reproduced without distortion.

In the foregoing discussion it was assumed that the photographic recording systems M1, A2, G1, S1, and M2, A4, G2, S3 had substantially no distortive effects upon the sound wave representations passing therethrough. While the systems may be and are preferably designed to approach closely this condition, if their characteristics are identical, any distortions actually caused by these systems are also compensated by the method. In this case, the original record Po will not be a perfect record but will contain distortions due to the photographic recording system M1, A1, G1, S1. But the corrective record C' added to original record Po will contain identical distortions caused by the photographic recording system M2, A3, G2, S3, and these distortions of recording will accordingly also be compensated.

It is essential that the sound wave representations be of like magnitudes in various parts of the system, and for this reason certain balancing operations should be effected. In the combined systems of Figs. 1 and 2, there will be at least one frequency of current at which all of distortional effects are balanced out or neutralized, and with the proper potentials, a photographic record Pd exactly like the original record Po is obtained. To balance the system, the current of this frequency is ascertained and induced in the system, and the system is then adjusted and permanently set at those potentials which give identical photographic records Pd and Po. With the system so balanced, a sound current of any frequency at which distortion is introduced will make a record Pd exactly like the original Po except for the distortions, and the currents represented by these records when differentially combined as in Fig. 3 will be exactly and perfectly neutralized except for the distortion current. In case the balancing of the above systems is not quite perfect, the system of Fig. 2 may be utilized to complete the matching of sound currents. For this purpose records Po and Pd are made at or as closely as possible to the above mentioned frequency at which no distortion occurs, and these are reproduced as sound currents in the system of Fig. 3. If the entire system is in balance, there will be no resultant current in the circuit 40, 41 and no further adjustment is necessary. If, however, the balancing is not perfect, it may be made so by adjusting the potentiometers 42 and 43 in the circuit 40, 41 until the resultant current is reduced to zero. The system is then in balance and readiness for operation.

A number of variations of the specific system and steps of the method may be made without departing from the scope of the invention. It is possible, for instance, to make only the photographic record Po originally; and then to reproduce it as a sound current at any convenient subsequent time for the purpose of making the distorted mechanical record R, the balance of the system operating substantially as before. In fact, the system of Fig. 1 is only a convenient one for the simultaneous making of a photographic record and a mechanical record, the system being such that the record R is simply a physical reproduction of record Po with the distortions of recorder 19 added. Or, in case the photographic recording systems do not cause appreciable distortion, the input leads 15, 16 of amplifier A2 may be connected across the leads 10, 11 between the microphone M1 and amplifier A1, as indicated by the dotted lines of Fig. 1, in which case the recording system making the distorted mechanical record upon the blank B is fed directly from the microphone M1 instead of through the light combination G1, S2, P1, the system thus not compensating distortions of photographic recording.

The systems and procedures that have now so far been described have involved the successive making of several photographic records each having certain definite characteristics. However, as I shall now proceed to describe, it is not necessary for a complete operation of my system that several of said photographic records actually be made, it being possible, and in some manners preferable, to carry on the system by utilizing the sound characteristics representing such intermediate photographic records. Accordingly I proceed to descriptions typical of such simplification.

For instance, instead of photographically combining records C' and Po upon the single film 53 for use in the corrected mechanical record making system of Fig. 4, we may arrange a system as shown in Fig. 10 and effect the combination electrically. For this purpose, the photo-electric cell P4 is disposed to receive light rays from separate illuminants I2 and I'2, these light rays being modulated by records Po and C' respectively contained upon separate films. Slits S6 and S'6 may be positioned between the films and illuminants, as shown. The sound current generated by P4 will then be the same as that generated by P4 in the system of Fig. 4, as will be understood; and the balance of the system will operate as before described.

By arranging a system such as is illustrated in Fig. 11, a distortion representing current may be electrically dubbed upon a sound current representing the original undistorted sound, thus dispensing with the necessity for making records C or C'. The system of Fig. 11 may be considered as a combination of the mechanical record making system of Fig. 4 with that part of the system of Fig. 3 which produces a distortion-representing sound current, the leads 44, 45 of the latter system being connected in series, with proper regard for signs, with the amplifier input leads 55, 56 of the system of Fig. 4 as shown. Record Po is then run before the photo-electric cell P4, and the sound current so produced is modified by the distortion-representing current of the circuit 44, 45. It will be noted that the system contains two photo-electric cells P2 and P4 in series for producing sound currents from the two records Po. The system may easily be arranged so that one cell serves to reproduce both of the records Po; or by putting into the circuit one sound current representation of Po at double strength, the other record Po and corresponding cell may be dispensed with.

By combining the system of Fig. 11, just explained, with the output of the distortion record making system of Fig. 2, the system of Fig. 12 may be obtained. In this system the final distortion-corrected mechanical record M may be made in one step from the mechanical record upon R, and the making of the photographic distortion record Pd is eliminated. As will be seen from the figure, the output of the microphone M2 of the system of Fig. 2 replaces the photo-electric cell P3 and record Pd of the system of Fig. 11. The operation is then that the output of microphone M2, which contains all of the distortions, is differentially combined with the output of photo-electric cell P2, and the distortion-representing current so obtained is dubbed with proper regard for signs, upon a sound current corresponding to the original and substantially undistorted sound as obtained from Po, the modified sound current so obtained being then amplified and utilized to produce the distortion compensated mechanical record M. In this case, as mentioned in connection with the system of Fig. 11, the sound current from one of the cells P2 or P4 may be put into the system at double strength, and the other cell and corresponding film be dispensed with.

In case the distortions introduced in making the mechanical record and in reproducing a sound current therefrom are negligible, the final mechanical record M may be compensated for the other distortions of the system without the making of any photographic records whatever. This modification has utility when it is desired to compensate the distortions of the speaker unit, the other elements of the system causing relatively little or no distortion. This may be accomplished by the system of Fig. 13, which is similar in arrangement to that of Fig. 12, as will be seen, but has in place of the two photo-electric cells P2 and P4 and their records Po, a mechanical record Ra and an electro-magnetic pick-up 20a, identical with record R and pick-up 20. This system has the units R, 20, A3 and H, and M in common with the system of Fig. 12, but in this case the amplifier A4 of Fig. 2 is included, its output leads 25, 26 being connected into the circuit 40, 41, as shown. The sound current generated by pick-up 20a is conducted into an amplifier A7, the output of which is in the circuit 40, 41. The leads 44, 45, in series with circuit 40, 41 are connected to amplifier A6, the remainder of the system, A6, 60 and M being arranged as before. It will be noted that the system includes only one record Ra in place of the two photo-electric cells P2 and P4, and the records Po, and therefore the sound current generated by pick-up 20a must be amplified to double strength before being combined with the output of amplifier A4. What is being done in this case is, in effect, differentially combining the distorted sound current in the output circuit 25, 26 of amplifier A4 with half of the undistorted sound current as obtained from Ra (neglecting distortions introduced in making and in reproducing a sound record of the mechanical type), thus producing a distortion-representing current, and dubbing this current upon the other half of the undistorted sound current obtained from Ra. This system accomplishes the same general result as the others described above with the exception of not compensating the distortions of making the mechanical record and of reproducing the electrical sound current, the compensation in this case being chiefly for the speaker unit. Under certain conditions, it may be possible to put amplifiers A3 and A7 in parallel, as indicated by the dotted lines 70, 71, and to dispense with the synchronously driven record Ra and pick-up 20a. This may be done if the time lag of the sound current representations in traveling through the units A3, H, M2, and A4 before combination with the sound currents traveling only through A7 is not objectionable. If the time lag is too great, some well known means for introducing a corresponding lag in the circuit of A7 may be placed in the circuit, and a proper combination may then be obtained.

From a consideration of the specific procedures which have now been described, it will now be readily seen that each and all of them involve characteristically a procedure which may be broadly stated somewhat as follows: First I make both a mechanical sound record and what I may term a perfect sound record (the original photographic record Po being substantially a perfect record of the original sound), but it not being essential, in the broadest aspect, that the perfect record be photographic since any other type of suitable record from which can be obtained an electrical sound current may be used as well. These two records may either be made simultaneously or one after the other; but in any case I then have the usual mechanical record which contains the distortions of mechanical recording; and, for comparison, I have a record which is substantially perfect. The final function and effect of all the different forms of my system is then, so to speak, to compare this original perfect record with the reproduction of the mechanical record for the purpose of obtaining a measure of the differences between them; and to negatively correct or compensate the mechanical record by the amount of the differences found in such comparison. And it will now be seen that such comparison and compensation is carried out in any of the variant forms of procedure, whether or not the several intermediate photographic records are made.

It will further be noted that, having made an original mechanical record, and so compared and compensated it, it is not only compensated for the deficiencies of the production but is also compensated for the deficiencies of original recording; or, what amounts to the same thing, compensated for the deficiencies of the final recording mechanism which is used in making the final corrected mechanical record (the final recording mechanism shown in Fig. 4 and similar figures). And therein lies the characteristic difference between the systems and procedures of my two mentioned copending applications and of this one. For instance, in the second mentioned copending application the electrical system of comparison and compensation is very similar to the corresponding operations here described; but in both said copending applications the described systems specifically involve comparison of a record with a reproduction of itself; whereas in this present application the system characteristically involves the comparison of a substantially perfect record with the reproduction of a mechanical record.

The invention has thus far been described as correcting for or compensating the distortions introduced in simply recording and reproducing sound records. The broad invention, however, has numerous applications in furtherance of this specific use. For instance, it may be embodied as applied to a correction of the distortion effects otherwise unavoidably introduced in radio broadcasting. For this purpose broadcasting would be done from mechanical sound records in which compensation has been made for the distortions introduced in their making and reproduction, and also for the distortions introduced by the radio broadcasting set, and by the average receiving equipment.

While the invention has been described and illustrated with the aid of a varying outline constant density photographic sound record, the invention is not to be limited to such operation, as any photographic record of varying density is adaptable to the invention. And the invention is not restricted to the correction of mechanical records, chosen herein for particular illustration, but is applicable to the correction or distortion compensation of all types of records of sound vibrations, including mechanical, magnetic or other types.

It is to be understood that the foregoing description and diagrammatic drawings are merely illustrative of rather than restrictive upon the invention, for various changes in the steps of the method and in the system may be made without departing from the spirit and scope of the broader of the appended claims.

I claim:

1. The method of compensating sound records that includes, making an original substantially perfect record and a mechanical record of the original sound, making a reproduction of the mechanical record, obtaining the measure of the difference between this reproduction and a representation of the substantially perfect record, and negatively compensating a mechanical record by the amount of the difference so found.

2. The method of compensating sound records that includes, making a substantially perfect record of a given sound, making a mechanical record of the same sound, reproducing the mechanical record to reproduce the sound therefrom, obtaining the measure of the difference between the reproduction sound and the sound represented in the substantially perfect record, and negatively compensating a mechanical record by the amount of the difference so ascertained.

3. The method of compensating sound records that includes, making a substantially perfect record of a given sound, making a distorted record of the same sound, reproducing the distorted record to reproduce the sound therefrom, obtaining the measure of the difference between the reproduction sound and the sound represented in the substantially perfect record, and negatively compensating a third record, which is otherwise a duplicate of the distorted record, by the amount of the difference so ascertained.

4. The method of compensating sound records that includes, making two records of the original sound, one being a substantially undistorted sound record, and the other being a sound record of the type that is to be used in final reproduction of the sound, audibly reproducing sound from the latter record, this sound having distortions, differentially combining a representation of the distorted sound with a representation of the originally made substantially undistorted record, and thus producing a representation of distortion, combining the representation of distortion with a representation of the originally made substantially undistorted record so as to produce a sound representation negatively distorted relatively to the normal distortions of reproduction, and making from said negatively distorted sound representation a final sound record, the final record being negatively distorted relatively to the distortions of its reproduction.

5. The method of compensating sound records that includes, making original substantially undistorted photographic and mechanical sound records of the original sound, audibly reproducing sound from the mechanical record, said sound having distortions, differentially combining a representation of the distorted sound with a representation of original sound, thus producing a representation of distortion, combining a representation of the original photographic sound record with the representation of distortion in such a manner that the resultant sound representation is distorted negatively relatively to the normal distortions, and making from said negatively distorted sound representation a distortion compensated mechanical record, said compensated mechanical record being distorted negatively to the distortions of its audible reproduction.

6. The method of compensating sound records that includes, making an original substantially undistorted record and a mechanical record of the original sound, reproducing sound from the mechanical record, this sound having distortions, producing a distorted electrical sound current of the distorted sound, producing synchronously therewith a substantially undistorted electrical sound current of the original sound, differentially combining the substantially undistorted sound current with the distorted sound current in such a manner as to produce a distortion representing electrical current, combining a representation of the distortion representing electrical current with a representation of the original undistorted record so as to produce a sound representation negatively distorted relatively to the normal distortions of reproduction, and making from this negatively distorted sound representation a final sound record, said final record being relatively negatively distorted to the distortions of its reproduction.

7. The method of compensating sound records that includes, making an original substantially undistorted record and a mechanical record of the original sound, reproducing sound from the mechanical record, this sound having distortions, producing a distorted electrical sound current of the distorted sound, producing synchronously therewith a substantially undistorted electrical sound current of the original sound, differentially combining the substantially undistorted sound current with the distorted sound current in such a manner as to produce a distortion representing electrical current, producing synchronously therewith a substantially undistorted electrical sound current of the original sound from the original undistorted record, combining the two last mentioned currents to produce an electrical sound current negatively distorted relatively to the distortions of reproduction, and making a final mechanical record of this negatively distorted sound current, said mechanical record being negatively distorted relatively to the distortions of its reproduction.

8. The method of compensating sound records that includes, making an original substantially undistorted record and a mechanical record of the original sound, reproducing sound from the mechanical record, this sound having distortions, producing a distorted electrical sound current of the distorted sound, producing synchronously therewith a substantially undistorted electrical sound current of the original sound, differentially combining the substantially undistorted sound current with the distorted sound current in such a manner as to produce a distortion representing electrical current, making a record of the distortion representing current, reproducing the distortion representing current, and synchronously therewith producing a substantially undistorted electrical sound current of the original sound, combining the two currents so that an electrical sound current negatively distorted relatively to the distortions of reproduction is produced, and making a final mechanical record of this negatively distorted sound current, said mechanical sound record being negatively distorted relatively to the distortions of its reproduction.

9. The method of compensating sound records that includes, making an original substantially undistorted photographic record and a mechanical record of the original sound, reproducing sound from the mechanical record, this sound having distortions, producing a distorted electrical sound current of the distorted sound, producing synchronously therewith a substantially undistorted electrical sound current of the original sound, differentially combining the substantially undistorted sound current with the distorted sound current in such a manner as to produce a distortion representing electrical current, making a photographic record of the distortion-representing current, combining upon a film a record of the distortion-representing current and an original undistorted photographic record in such a manner that opacity is relatively added to the original record in a sense negative to the distortions, producing an electrical sound current from the last mentioned combined records, and making from this sound current a final mechanical record, said mechanical record being negatively distorted relatively to the distortions of its reproduction.

10. The method of modifying sound records that includes, producing an electrical sound current from the original sound, making an original substantially undistorted photographic sound record from the sound current, making a mechanical sound record having the distortions of mechanical recording from the sound current, reproducing audible sound from the said mechanical record, said sound having the distortions of mechanical recording and reproduction, making a photographic distortion record of the distorted sound as so reproduced, synchronously producing electrical sound currents from the original substantially undistorted and the distortion photographic sound records, differentially combining the sound currents so obtained in such a manner that the sound currents are neutralized except for a distortion-representing electrical current, making a photographic correction record of the distortion-representing current, making a photographic distortion-corrected record by printing upon a film an original photographic record and a photographic correction record, all in a manner that opacity is relatively added to the original record in a quantity varying by the amount of and negatively to the sense of the distortions, producing a distortion-corrected electrical sound current from the photographic distortion-corrected record, and making a distortion-corrected mechanical sound record therefrom, said mechanical sound record being relatively negatively distorted to and by the amount of the distortions normally arising in its audible reproduction.

In witness that I claim the foregoing I have hereunto subscribed my name this 8 day of May, 1928.

ROY J. POMEROY.